US005621380A

United States Patent [19]
Mutoh et al.

[11] Patent Number: 5,621,380
[45] Date of Patent: Apr. 15, 1997

[54] VEHICLE ANTI-THEFT DEVICE

[75] Inventors: Eiji Mutoh; Suguru Asakura; Akira Nagai, all of Wako, Japan

[73] Assignee: Honda Giken Kogyo Kabushiki Kaisha, Tokyo, Japan

[21] Appl. No.: 464,374

[22] Filed: Jun. 5, 1995

[30] Foreign Application Priority Data

Sep. 28, 1994 [JP] Japan .................................. 6-257375
Apr. 19, 1995 [JP] Japan .................................. 7-116559

[51] Int. Cl.$^6$ .................................................. B60R 25/10
[52] U.S. Cl. ........................ 340/426; 307/10.5; 307/10.2
[58] Field of Search ............................. 307/10.5, 10.2; 340/426, 825.5

[56] References Cited

U.S. PATENT DOCUMENTS

| | | | |
|---|---|---|---|
| 4,291,237 | 9/1981 | Kitano | 307/10.3 |
| 4,366,466 | 12/1982 | Lutz | 307/10.5 |
| 4,385,296 | 5/1983 | Tsubaki et al. | 340/825.72 |
| 4,858,453 | 8/1989 | Namazue | 340/426 |
| 4,931,664 | 6/1990 | Knoll | 340/426 |
| 4,965,460 | 10/1990 | Tanaka et al. | 307/10.2 |
| 5,136,284 | 8/1992 | Kitamura | 307/10.5 |
| 5,159,329 | 10/1992 | Lindmayer et al. | 307/10.1 |
| 5,416,471 | 5/1995 | Treharne et al. | 340/426 |

FOREIGN PATENT DOCUMENTS

| | | |
|---|---|---|
| 0372741 | 6/1990 | European Pat. Off. . |
| 0385070 | 9/1990 | European Pat. Off. . |
| 0525895 | 2/1993 | European Pat. Off. . |
| 2046827 | 11/1980 | United Kingdom . |
| WO92/08864 | 5/1992 | WIPO . |

OTHER PUBLICATIONS

Chubb Locks, "Opening Up a World of Key–Based Security Locking", *Design Engineering*, Apr. 1993, p. 23.

*Primary Examiner*—Jeffery Hofsass
*Assistant Examiner*—Mohammed R. Ghannam
*Attorney, Agent, or Firm*—Pollock, Vande Sande & Priddy

[57] ABSTRACT

A vehicle anti-theft system in which a registration of an ID code of a new key to a vehicle side cannot easily be made by an ill-intentioned third party. Provided are a first memory for storing ID codes of operation keys and a second memory for storing an ID code of an L-key. Of a particular ID code of an inserted key has been registered as an operation key in the first memory, an immobilizer code stored in an immobllizer code memory is sent out to an engine ECU to enable the engine to be started up, and if the registered L-key is inserted, and operation keys are successively inputted, the renewal mode for the ID code is activated to rewrite the ID codes of the previously registered operation keys with ID codes of subsequently inserted operation keys in the first memory.

6 Claims, 9 Drawing Sheets

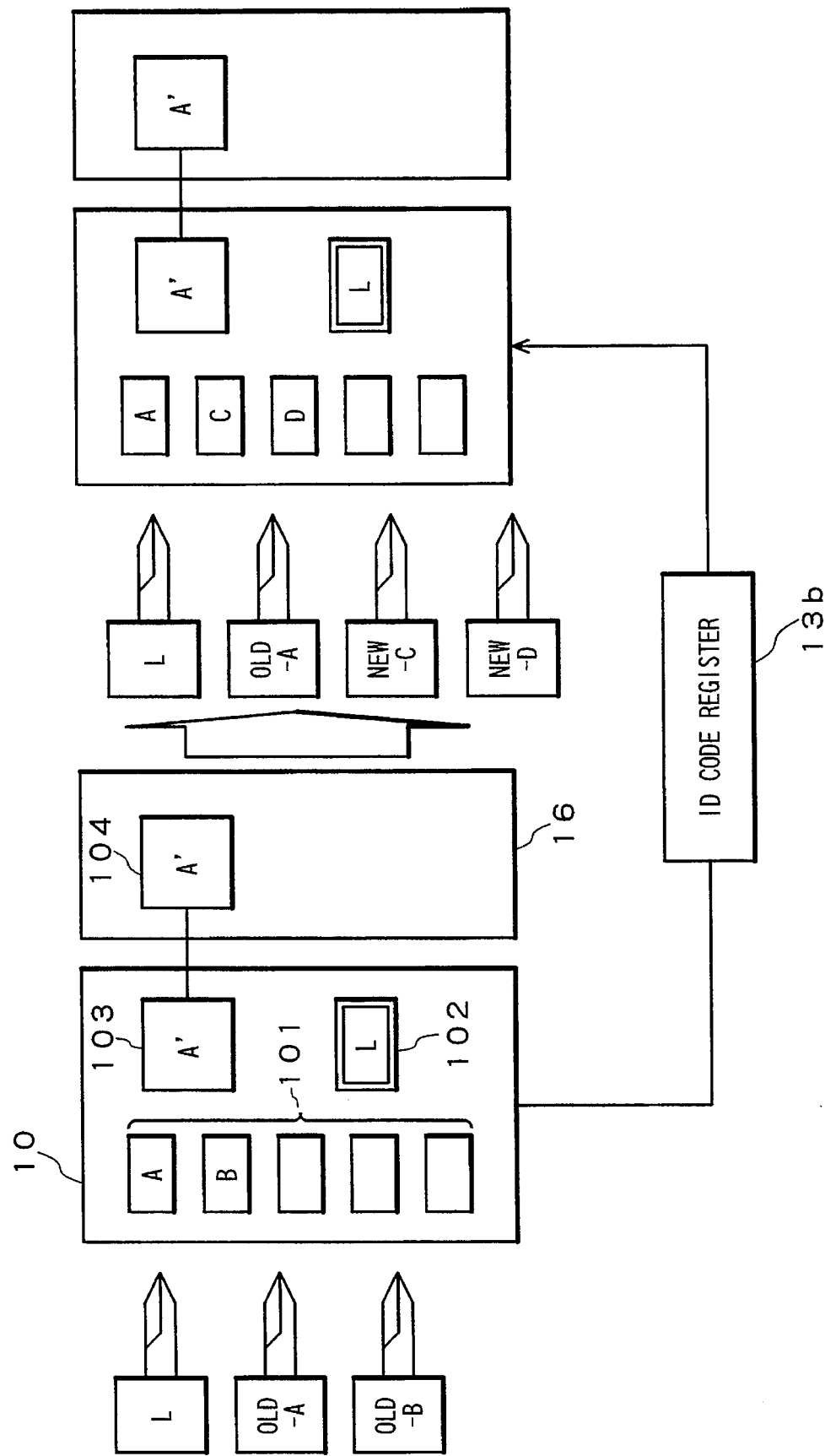

VEHICLE ANTI-THEFT DEVICE

BACKGROUND OF THE INVENTION

1. Field of the Invention

The present invention Is related to a vehicle anti-theft device, and particularly to a vehicle anti-theft device in which the start-up of the engine is enabled on condition that a predetermined relationship is satisfied by the ID code previously registered in the engine key or the like and the ID code previously registered on the vehicle side.

2. Description of the Prior Art

In some of the various proposals for preventing the theft of a vehicle such as a car, the vehicle is prevented from being started or it is immobilized by mechanical and/or electrical means when it is attempted to be started or moved using a wrong key. This is achieved by previously storing an identification code or a key ID code in a key, reading the key ID code when the key is inserted into a key cylinder to start the vehicle, comparing it with a reference ID code prestored in the vehicle side, generating an enable signal only when there is a match between both ID codes, and enabling the engine to be started up only when an engine control unit successfully receives that signal. In this case, since a theft may be committed by mechanical breakage or illegal wiring if the enable signal is a binary signal of on/off, the encoding of the enable signal has been proposed, for instance, in the "Car Technology", Vol. 48, No. 8, 1994, pp. 59–64.

An example of such a conventional transponder type immobilizer is shown in FIG. 9. A key 2 includes a memory (not shown) in which a key ID code (for instance, of 64 bits) is prestored, and a transmitter 4 for transmitting the key ID code. The transmitter 4 of the key 2 and a key cylinder 5 are coupled together by, for instance, an induction coil (antenna) 6.

When the key 2 is inserted into the key cylinder and rotated to the ignition-ON position, an ignition switch 7 is closed. In response to this, an immobilizer CPU 13 in an immobilizer control unit (ICU) 10 operates, and operating electric power is supplied from a power amplifier 11 to the transmitter 4 through the coil (antenna) 6. The transmitter 4 responds to this to read the key ID code, and transmits it to the key cylinder 5 side.

The received key ID code is detected and digitized by a R/F (radio frequency) circuit 12 in the ICU 10, and read into the CPU 13 and temporarily stored in an appropriate ID code register 13B in the CPU 13. In an EEPROM 13A of the CPU 13, a unique reference ID code assigned to each vehicle is prestored, and tile reference ID code and the key ID code which was read in are compared with each other by a compare unit 13S of the CPU 13. If it is determined that there is a match between the two or they are in a predetermined relationship, an enable code is transmitted from the compare unit 13S to an engine control unit (ECU) 16. At the same time, a starter relay 15 is activated to initiate the rotation of a starter motor (not shown).

When the engine ECU 16 has determined and verified the received enable code, the engine ECU 16 controls a fuel injection valve 17, a fuel pump 18, an ignition control unit 20, etc., according to a predetermined procedure and timing to enable the start and travel of the vehicle.

If the reference ID code stored in the EEPROM 13A and the key ID code transmitted from the key 2 and read in do not match each other or they are not in a predetermined relationship, the compare function unit 13S does not issue an enable code. Accordingly, the start of the vehicle by the ECU 16 is inhibited, and a horn 14 is activated by the CPU 13 to provide an appropriate alarm and display. Thus, the illegal start-up of the engine and the driving of the vehicle by a wrong key are prevented to ensure the vehicle anti-theft function.

However, if an ID code is provided for each key, there must be thousands or tens of thousands of different ID codes, and thus, usually, the maker or seller of keys does not manage keys depending on these ID codes for the convenience of the manufacturing or management of keys. Accordingly, if a user has lost or broken his key, it would be extremely difficult to specify and buy a key having the same ID code. Thus, if a key was lost, it would be necessary to purchase a new key of a different ID code, and newly register the ID code of this new key on the vehicle side.

For the new registration of a key having a new ID code, as described, for instance, in the Japanese Patent Publication No. 3-76077 official gazette, a switch for switching the operation mode to either a "write mode" or a "read mode" for an ID code was provided, and normally, or for operating the anti-theft function, it is switched to the "read mode" side, while for registering the ID code of a new key, it is temporarily switched to the "write mode".

In the above prior art, the switching means for specifying the "read mode" or the "write mode" is indispensable, and the registration of a new key can very easily be done by switching this switch. Accordingly, there is a problem that, if an ill-intentioned third party has got a new key and newly registered it by switching this switch means, the start-up of the engine by the new key is enabled and the theft of the vehicle can easily be accomplished.

SUMMARY OF THE INVENTION

It is an object of the present invention to provide a vehicle anti-theft device, in which the registration of an ID code of a new key to the vehicle side cannot easily be done by an ill-intentioned third party. To this end, a vehicle anti-theft device of the present invention was equipped with a first memory means for storing one or more first ID codes each enabling the start-up of an engine, a second memory means for storing a second ID code that is different from the first ID codes and activating the renewal mode in which the first ID codes may be rewritten, a registration discrimination means for comparing an inputted ID code with the first and second ID codes registered in said respective memory means thereby to determine whether or not the inputted ID code has been registered, an enabling means for generating an enable signal when an inputted ID code is determined to be the same as any one of the first ID codes, an engine control means responsive to the enable signal for controlling the engine so that the engine is started, and a renewal mode activation means for activating the renewal mode when the inputted ID code is determined to be the second ID code where in the renewal mode, when a particular first ID code registered and at least one of other ID codes are consecutively input in this order, the particular first ID code and the at least one other ID code are registered in the first memory means as new first ID codes.

In accordance with the above construction, if one of the means (for instance, keys) for sending out the first ID code has been lost or broken, the new registration of an unregistered ID code to the first memory means cannot be allowed unless the means (for instance, key) for sending out the second ID code and another means for sending out the first ID code are both provided. That is, it is impossible for an ill-intentioned third party to newly register the ID code of a means for sending out an unregistered ID code, unless the means whose ID code is already registered in the first memory means and the means whose ID code is already registered in the second memory means are both provided.

BRIEF DESCRIPTION OF THE DRAWING

FIG. 2 is a diagram showing a process of registering new keys.

DESCRIPTION OF THE PREFERRED EMBODIMENTS

Figure 1:
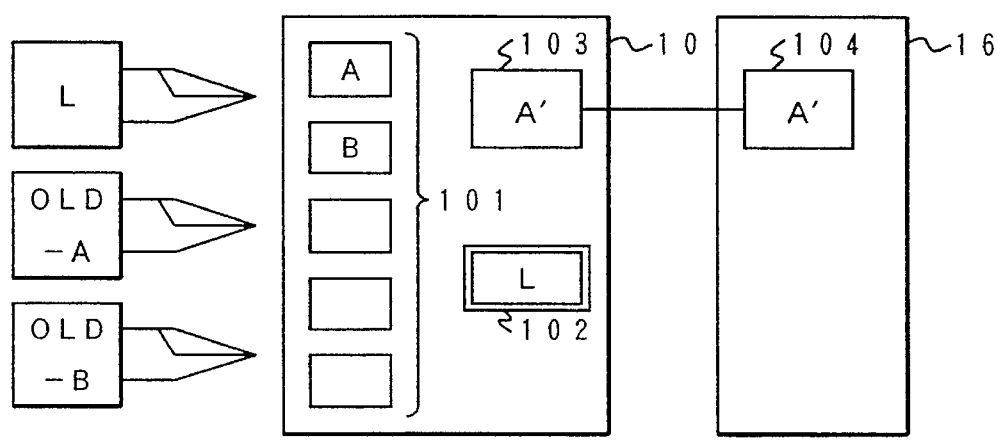
FIG. 1 is a block diagram showing a main construction of the present invention.

Now, the present Invention is described in detail with reference to the drawings. FIG. 1 is a block diagram showing the construction of the ICU 10, in particular, only the construction of the portions related to the registration of the ID codes of keys, in which there are provided a first ID code memory means 101 in which the ID codes of a plurality of operation keys are stored, a second ID code memory means 102 in which the ID code of a single learning key is stored, and an immobilizer code memory means 103 in which an immobilizer code is stored. The respective memory means 101 to 103 can all be provided in the EEPROM 13A.

The operation keys are so-called engine keys for turning on/off the ignition (IG) switch, opening/closing the door, and the like. The learning key is used to register the ID codes of operation keys to be authorized in the ICU 10. In this embodiment, description is made on the assumption that, when each vehicle is delivered to the user, two operation keys A and B each having a different ID code and a single learning key (L-key) are attached to it.

Figure 12A:
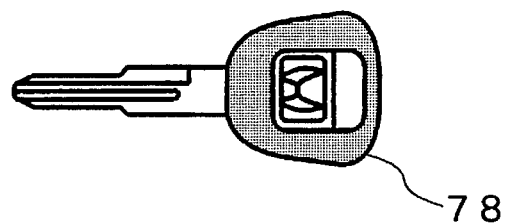
FIGS. 12A to 12D are diagrams showing appearances of each key.
Figure 12B:
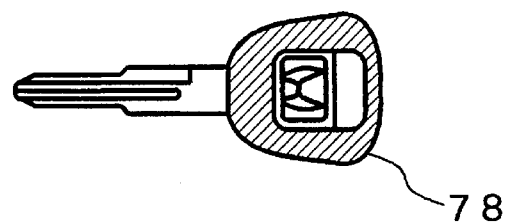
Figure 12C:
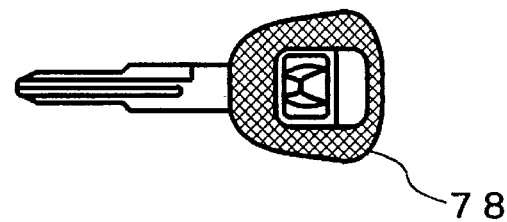

As described above, the operation keys and the learning key are used in completely different ways. In addition, the two operation keys A and B have different uses, that is, one of them functions as a master key as described later. Accordingly, it is desirable that the appearances of the respective keys should be made different from each other so that they can be distinguished at a glance. Each of FIGS. 12A to 12C shows an example of the appearance of each key. FIGS. 12A, 12B represent the operation keys, and FIG. 12C represents the L-key. In this embodiment, by covering the head 78 of each key with a resin and making the color (in the figure, hatching) of the respective resin different from each other, they are distinguished by appearance. Such distinction in appearance may also be provided by making the heads 78 in different shapes.

Figure 12D:
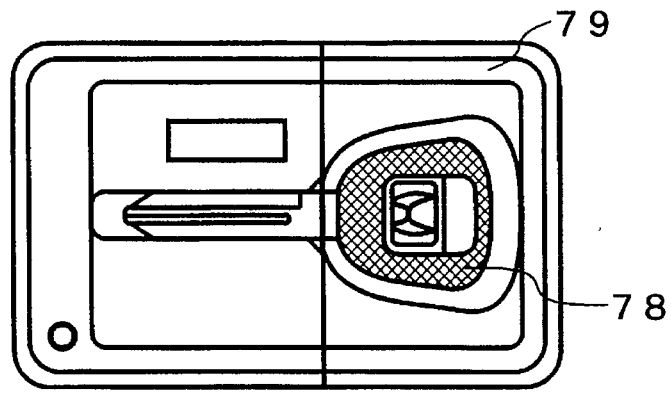

Further, in this embodiment, the use frequency of the L-key is very low as compared with that of the operation keys, and it is desirable for the user or an operator to refer to an instruction manual when the L-key is used. Thus, in this embodiment, as shown in FIG. 12D, only the L-key is contained in a package 79 to prevent the misuse of it, and the instructions on usage is given on the back of the package 79 or the instruction manual is contained within it.

To make the ICU 10 learn the L-key and the operation keys for the first time after a particular vehicle has been manufactured, the L-key, operation key A and operation key B are inserted into the ignition key cylinder and turned to the ignition-ON position in this order, whereby the ID code "ID-L" of the L-key is stored in the second or ID code memory means 102, and the ID codes "ID-A" and "ID-B" of the operation keys A and B are stored in the first or ID code memory means 101 within the ICU 10.

In the following description, by representing the operation key whose ID code has been registered in the ICU 10 as an old key (old key A, old key B), an unregistered operation key (new key) and a registered operation key (old key) are distinguished each other.

After the ID codes of the operation keys have been registered in this way, an enable code ID "II-A" is created on the basis of the ID code of an operation key which is inserted first (in this case, old key A and "ID-A"), and registered in the third or immobilizer code memory means 103 as an immobilizer code. Further, the immobilizer code Is also transferred to the engine ECU 16 and stored in an immobilizer memory means 104 within the engine ECU 16. In this case, the old key A becomes the master key since the immobilizer code is generated on the basis of the old key A.

The anti-theft function and the process of registering new keys according to the present embodiment is now described with reference to the flowchart of FIGS. 8A and 8B.

When a key is inserted in the key cylinder and turned to the ignition-ON position, the ID code of the key is read in step S1, and in step S2 it is determined whether or not the ID code has been registered in this key. If the key has no registered ID code in it, the process goes to step S23 where it is determined that there is a code mismatch, and the process is terminated. Accordingly, if the key has no registered ID code, it is impossible to start up the engine.

If the key has a registered ID code, then in step S3 it is determined whether or not the key ID code is for the L-key, and the process goes to step S4 if it is not the ID code of the L-key. In step S4, to determine whether or not the key is a valid old key, the key ID code is compared with the old key code which has been already registered in the ID code memory means 101, and if the key ID code is already registered, then the key inserted is determined to be an old key and the process goes to step S5.

In step S5, the immobilizer code "ID-A" is sent out from the ICU 10 to the engine ECU 16. The engine ECU 16 compares the received immobilizer code (ID-A) with the immobilizer code stored in the immobilizer code memory region 104, and the engine ECU is activated if these two codes match. This allows tile engine to be started up.

If it is determined in step S4 that the inserted key is not an old key, the process goes to step S23 where it is determined that there Is a code mismatch as described above, Accordingly, if the key ID code is not registered in the ID code memory means 101, it Is impossible to start up the engine.

The following description is related to a case in which a user has lost the old key B and newly and additionally registers operation keys C and D. FIG. 2 shows how each ID code is stored in the ICU 10 for the new registration.

Figure 8A:
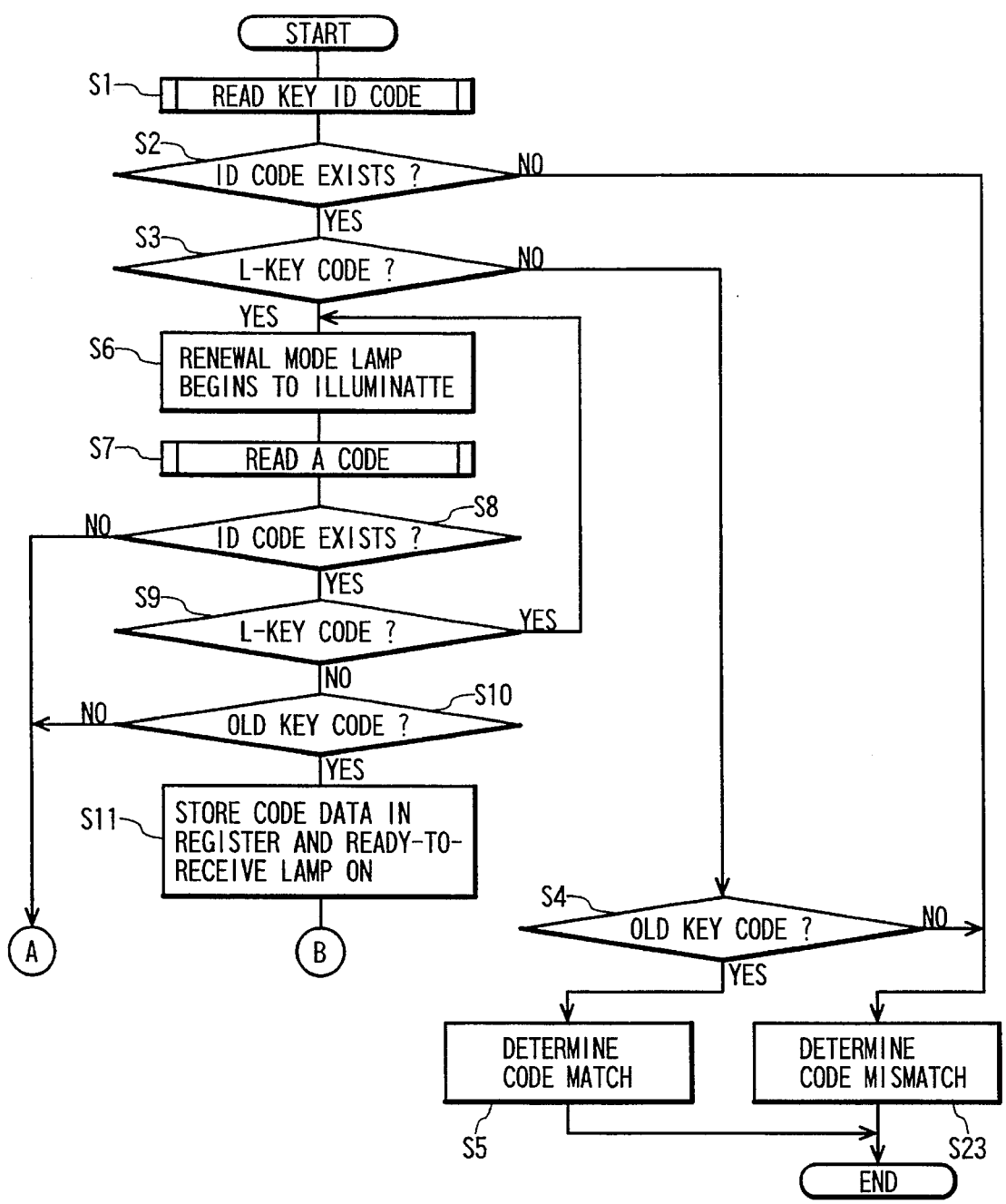
FIGS. 8A and 8B are, together, a flowchart showing operation of a first embodiment of the present invention.
Figure 8B:
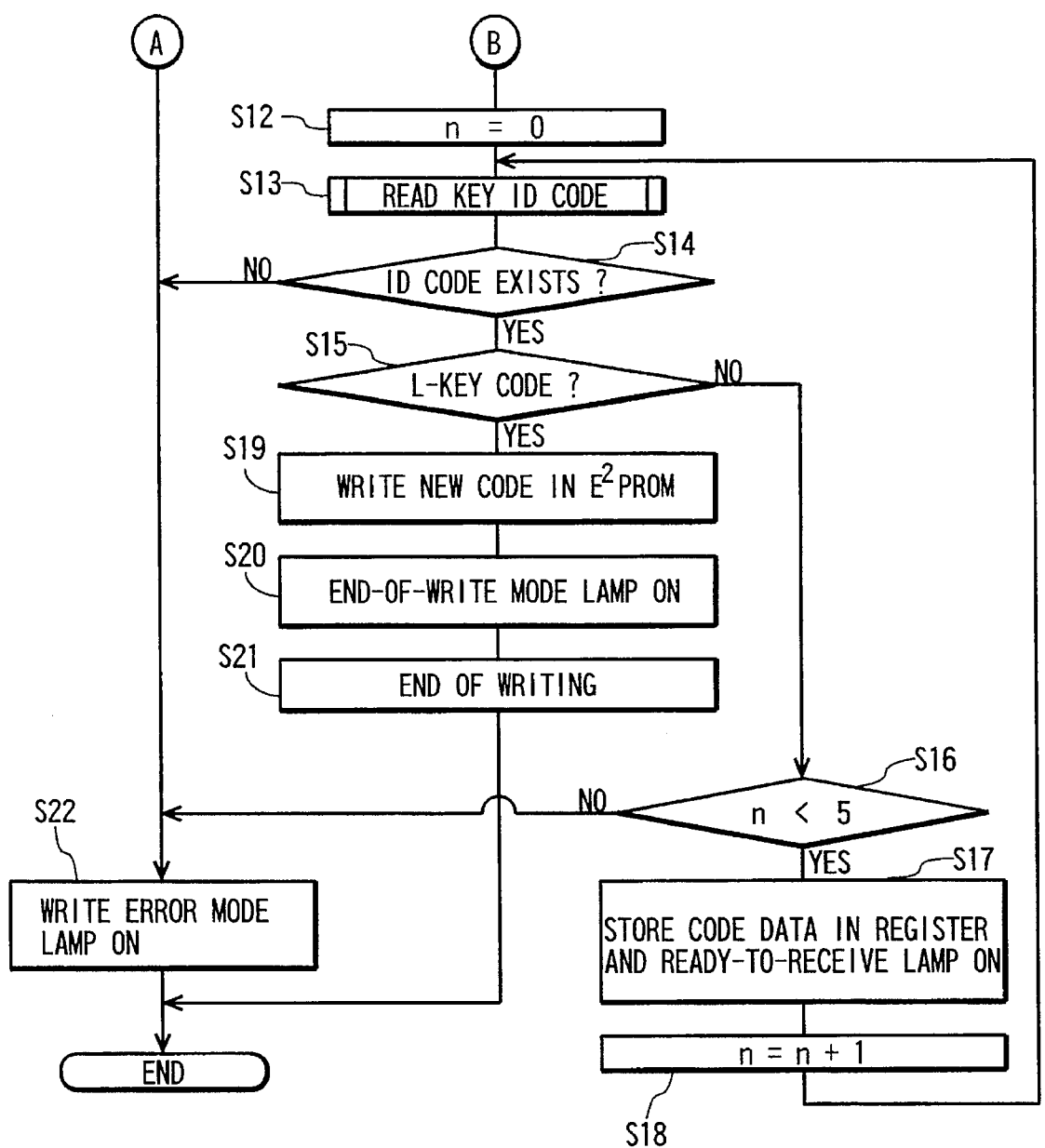
Figure 9:
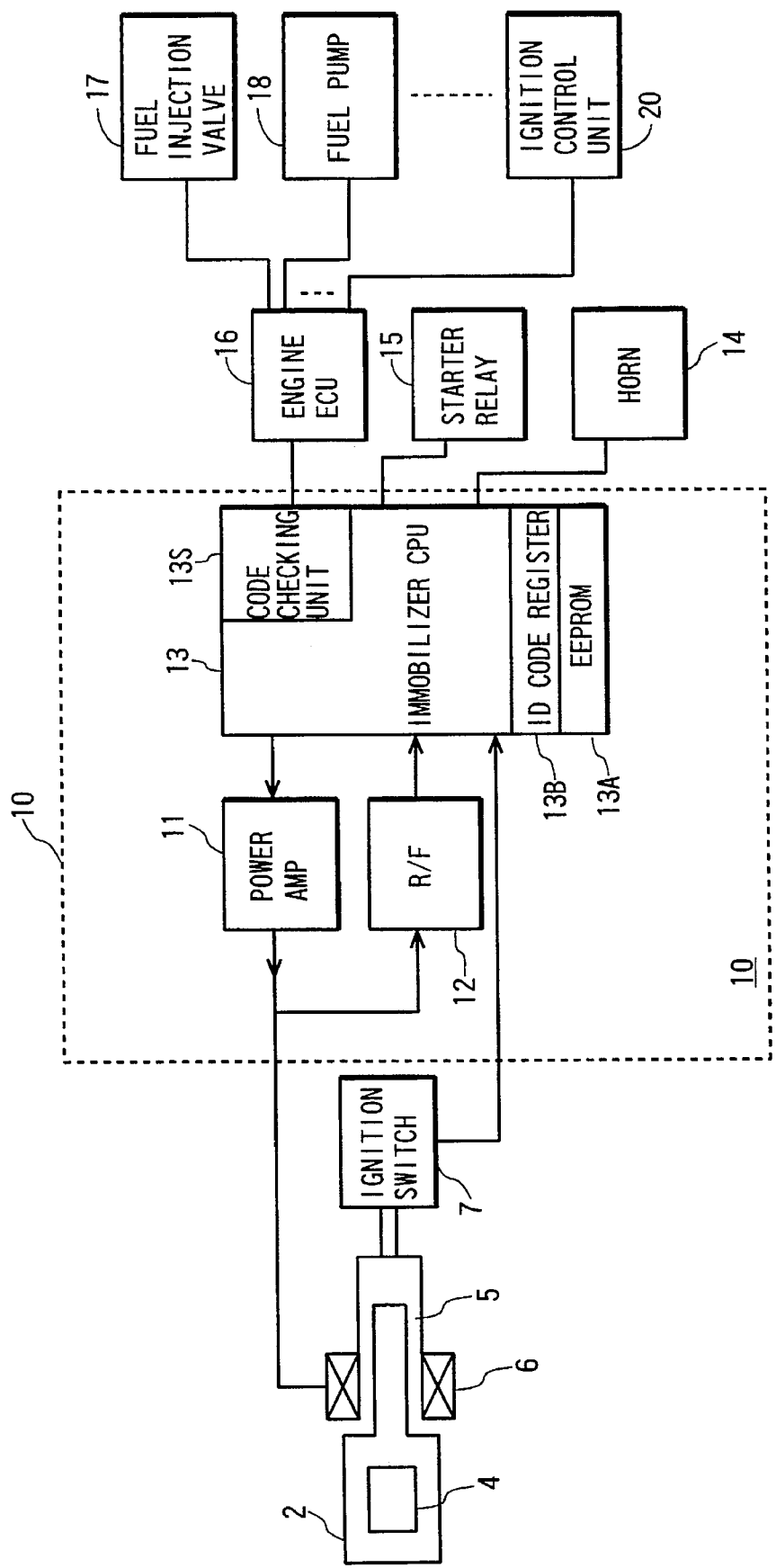
FIG. 9 is a block diagram showing the conventional transponder type immobilizer.

To newly register an operation key, the user first inserts the L-key into the key cylinder and turns it to the ignition- ON position, and then, in step S1 of FIG. 8A, the ID code of the L-key is read. In step S2, it is determined whether or not the ID code has already been registered in the key inserted. In step S3, the ID code of the L-key inserted is compared with ID code preregistered in the ID code memory means 102, and if it has been registered, the inserted key is determined to be the right L-key and the process goes to step S6; otherwise the process goes to step S23 through step S4 where it is determined that there is a code mismatch.

If it is determined in the step S3 that the inserted L-key is the right L-key, an operation key registration (update) mode starts. In this registration mode, since enable signal for permitting the operation of the engine is not sent out to the engine ECU 16, the engine is not started up even if the L-key is the right one.

Figure 3:
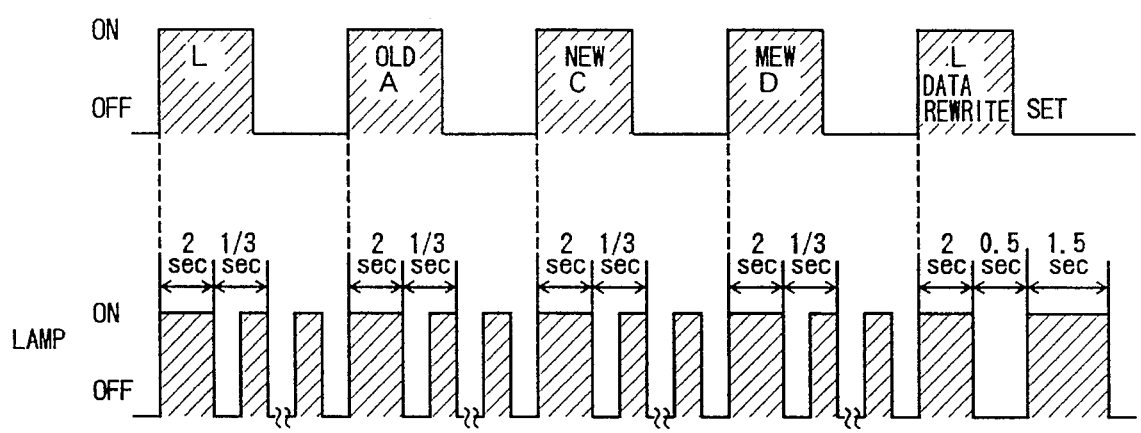
FIG. 3 to FIG. 7 are diagrams showing embodiments of display of a mode lamp.
Figure 11:
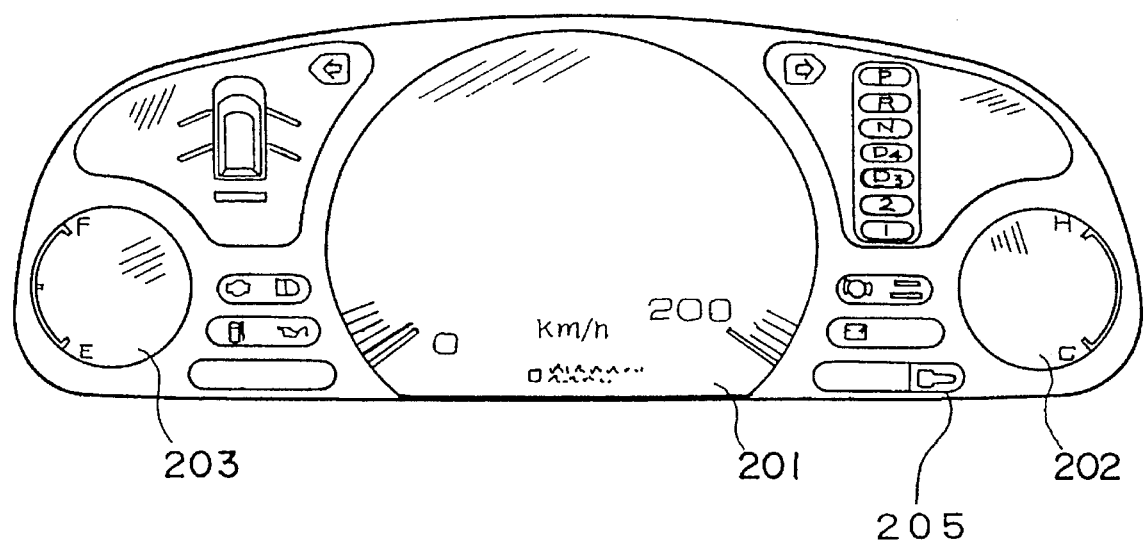
FIG. 11 is a diagram showing embodiment of an instrument panel.

In step S6, a renewal mode lamp illuminates for informing the user of the operation timing for the new registration of a key. A lamp 205 is provided, as shown in FIG. 11 for instance, in the instrument panel along with a speed meter 201, a water temperature gauge 202, a fuel gauge 203 and the like, and it periodically repeats a continuous lighting and blinking display thereby to inform the user of the timing for insertion or removal of the key to be newly registered into or from the key cylinder. In the present embodiment as shown in FIG. 3, if the key is determined to be the right L-key, the lamp first continuously lights for two seconds and thereafter repeats a blink of 3 Hz.

Figure 4:
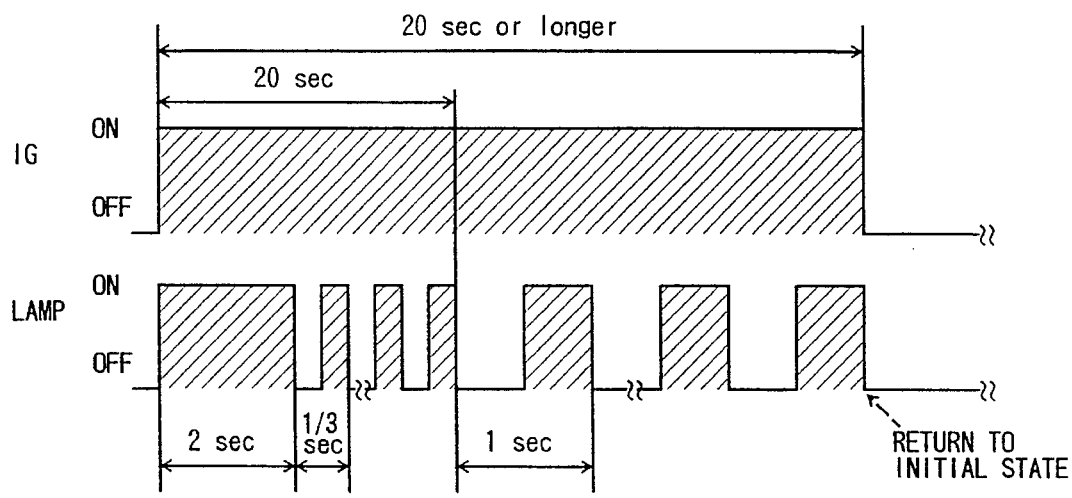

After holding ON of the ignition switch (IG) by the L-key for about three seconds, the user removes the L-key from the key cylinder, and then inserts the remaining old key A into the key cylinder and turns it to the ignition-ON position. If the key is held for 20 seconds or longer with the ignition-ON, it is determined to be a wrong operation, and the blink of 3 Hz changes to a blink of 1 Hz as shown in FIG. 4. Since the mode lamp is turned off when the key Is removed, the user can recognize that the registration mode for a new key has been stopped and the initial condition has been restored.

Figure 5:
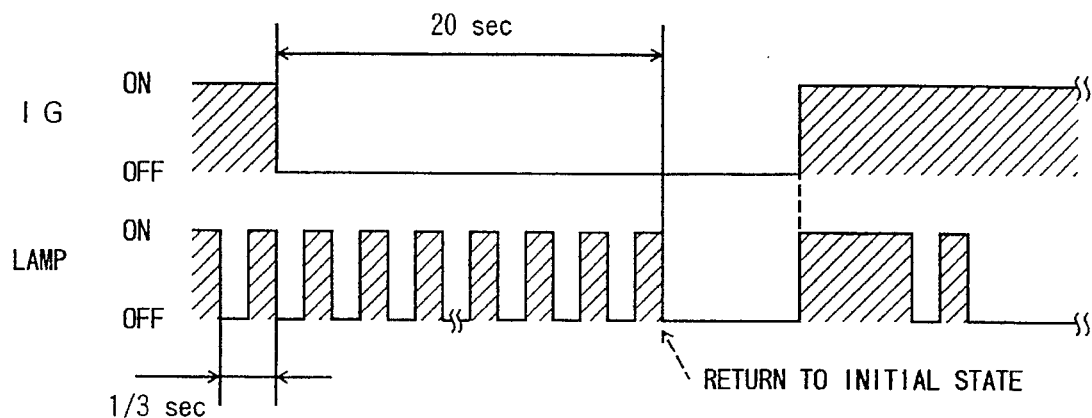
Figure 7:
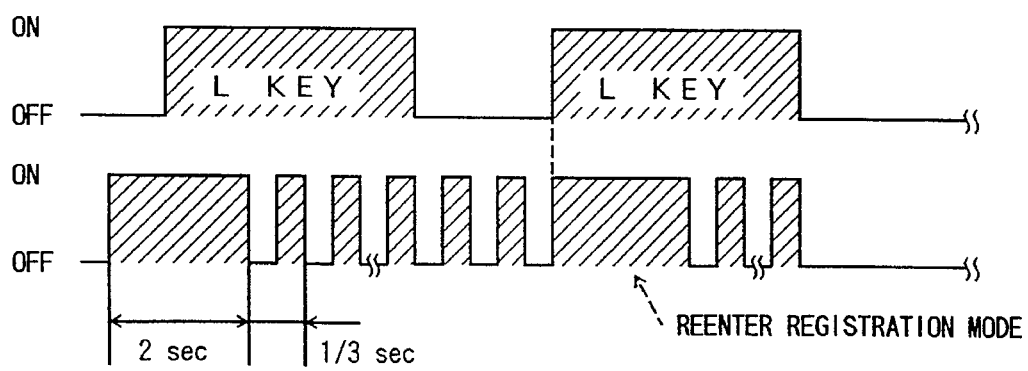

Further, if 20 seconds or a longer time has elapsed after the key is removed from the key cylinder and before the next key is inserted, the blink of 3 Hz goes out as shown in FIG. 5, and thus, the user can also recognize in this case that the registration mode for a new key has been stopped and the initial condition has been restored. In addition, if the L-key is inserted again after the L-key is removed from the key cylinder, the registration mode for a new key is started by the L-key which was inserted secondly, as shown in FIG. 7.

When a second key is inserted within 20 seconds after the L-key has been removed from the key cylinder, in step S7 the ID code of the second key is read, and in steps S8, S9 and S10, the pre-registration of the ID code and the type of the second key are determined as described above. If the ID code of the second key has already been registered in the ID code memory means 101, it is determined that the second key is the old key, and in step S11 the ID code of the second key is temporarily stored in ID code register 13B. Also in this case, the mode lamp lights up for two seconds from the point of time at which the ignition switch is turned on by the old key A, and repeats a blink of 3 Hz thereafter as shown in FIG. 3. In step S12, "0" is set as a count value n for counting the number of newly registered keys.

When the temporary storage of the old key A is finished, the user removes the old key A from the key cylinder, and now inserts a new operation key C into the key cylinder and turns it to the ignition-On position. Thereafter, in step S13, the ID code of the inserted key is read again, and in steps S14 and S15, the existence of the ID code and the type of the inserted key are determined. Since the ID code of the inserted operation key C is not the ID code of the L-key now, then in step S16, the count value n is referred to, and the process goes to step S17 if the count value n is smaller than 5. In step S17, the ID code of the operation key C inserted is temporarily stored in the ID code register 13B. In step S18, the count value n is updated by one. In this embodiment, five memory regions are prepared in the ID code memory means 101 as shown in FIGS. 1 and 2, so that five old keys can be registered.

When the learning of the operation key C is finished in this way, the process again goes back to step S13. If the user removes the old key C from the key cylinder, and inserts a still other new operation key D into the key cylinder and turns it to the ignition-ON position, then the above process of steps S13–S18 is repeated to temporarily store the ID code of the operation key D in the ID code register 13B.

Figure 6:
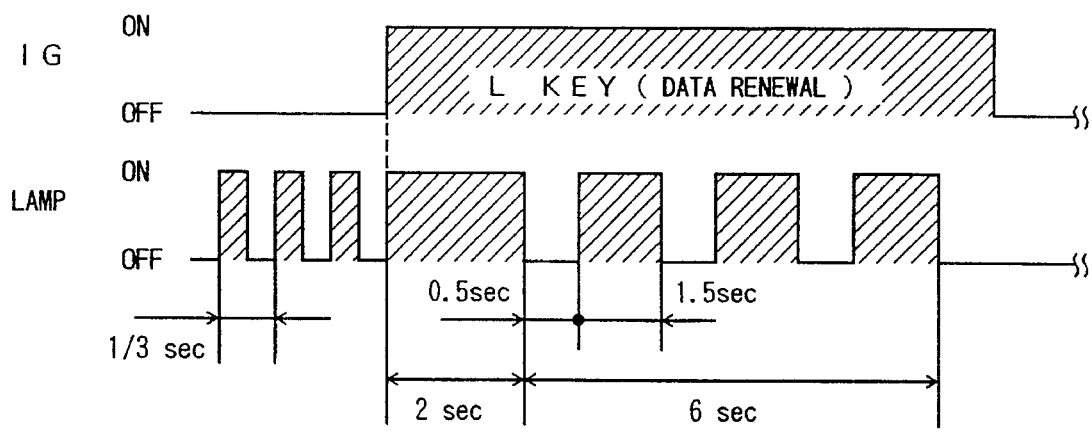

Thereafter, when the L-key is again inserted in place of the operation key D, it is determined in step S15 that the ID code of the inserted key is of the right L-key, then the mode lamp lights up again, and in step S19, the ID codes of the respective operation keys B, C and D temporarily stored in the ID code register 13B are newly registered in the ID code memory means 101, completing the ID code renewal for the old keys. In step S20, as detailed in FIGS. 3 and 6, the mode lamp lights up for two seconds, and thereafter repeats for six seconds in which the lamp goes out for 0.5 seconds and lights up for 1.5 seconds, thereby to inform the user of the completion of the registration.

If the determination in tile steps S8, S10, S14 or S16 is negative, then the process goes to step S22. In step S22, the mode lamp lights up for two seconds, and thereafter repeats a blink of 1 Hz to inform the user of the occurrence of an error.

In accordance with the present embodiment, if one of the operations keys(for example old key B) has been lost or broken a new operation key cannot be registered without both of the already registered L-key and the other operation key (old key A), and thus the new registration of a new key is prevented even if a third party illegally gets only the L-key. Accordingly, the theft of the vehicle by the illegal registration of a new key in the vehicle by an ill-intentioned third party can reliably be prevented.

Moreover, in accordance with the present embodiment, when the learning mode starts, the display pattern of the mode lamp appropriately changes to inform the user of the operation timing, the effectiveness of the operation performed by the user and the like, thereby ensuring that the user can correctly register a new key.

Although, in the above embodiment, the description has been made of the case in which the old key B other than the master key (old key A) has been lost, the old key can also be renewed by using the already registered L-key and the old key B even if the old key A or the master key has been lost. However, if the old key B is used for the renewal, an immobilizer code is created based on the old key B and this immobilizer code "ID-B" does not match the immobilizer code "ID-A" already registered in the immobilizer memory means 104 in the engine ECU 16, and thus the engine cannot be started up. Consequently, in this case, it is required to renew the immobilizer code in the engine ECU 16 at the same time, but the renewal of the immobilizer code needs to be made using a special tool in a service station or the like.

Figure 10:
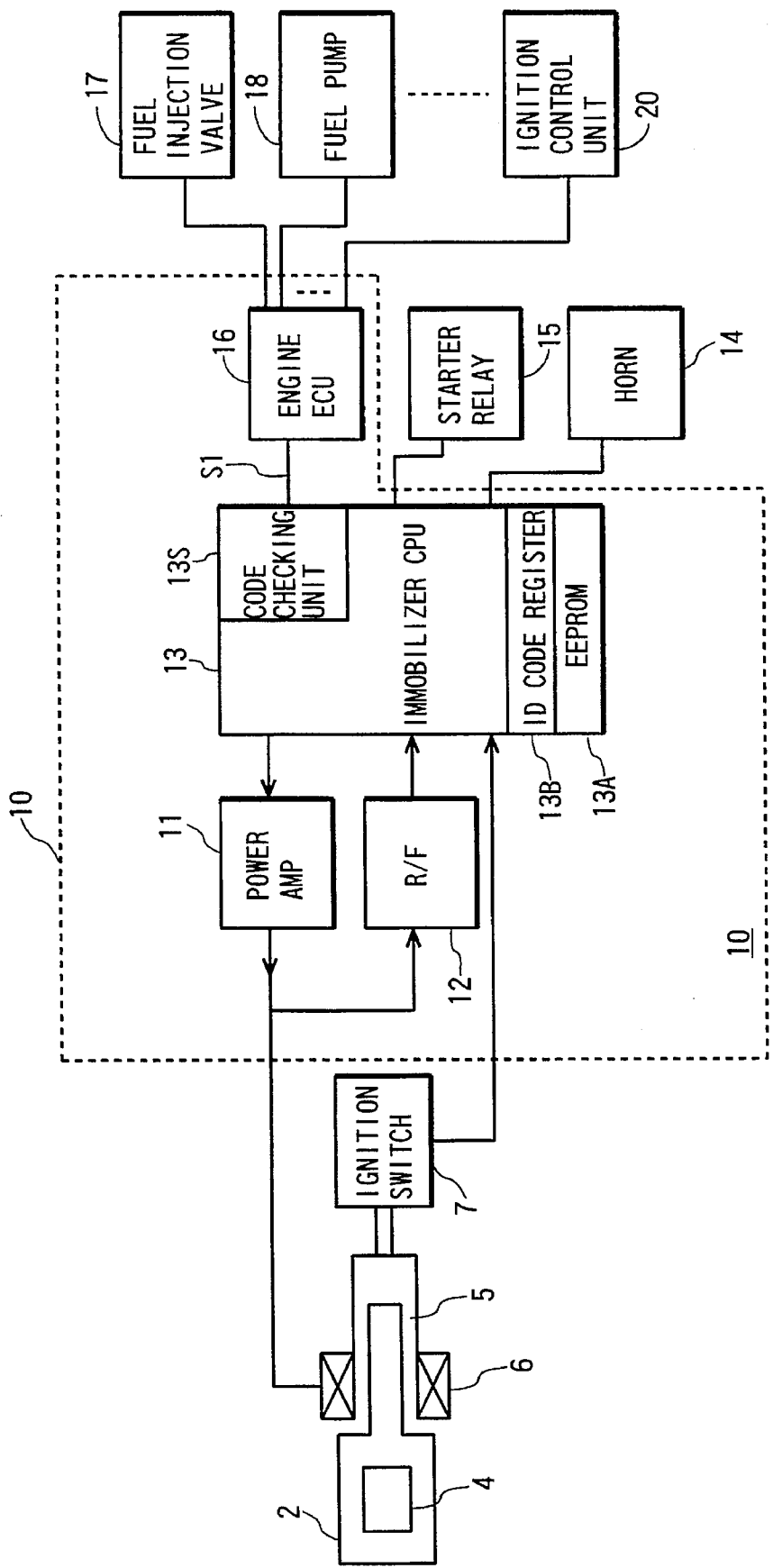
FIG. 10 is a block diagram showing the other construction of the present invention.

In addition, in the above described embodiment, it is assumed that the ICU 10 and the engine ECU 16 are separated from each other and an encoded enable signal is sent from the ICU 10 to the engine ECU 16. However, the present invention is not limited to this arrangement for instance, the engine ECU 16 may be integrally incorporated into the ICU 10 as shown in FIG. 10. In this case, the signal sent from the ICU 10 to the engine ECU 16 need not always be encoded.

In accordance with the present invention, the following effects are expected.

(1) If one of the registered operation keys (old keys) has been lost or broken, the new registration of a new operation key cannot be made without both of the registered L-key and the other registered operation key, so that the new registration of an operation key is prevented even if a third party illegally gets only the L-key. Accordingly, the vehicle is reliably prevented from being stolen by an ill-intentioned third party newly registering a new key in the vehicle.

(2) When the learning mode (update, registration) starts, the display pattern of the mode lamp appropriately changes to inform the user of the operation timing, the effectiveness of the operation performed by the user and the like, so that the user can correctly make the registration of a new key.

(3) Since the engine does not start up in the learning mode, the operator can make the new registration of a new operation key without being in a hurry.

(4) Since the respective keys are made different in appearance, the misuse of the keys is prevented.

What is claimed is:

1. A vehicle anti-theft device comprising:

a first memory means for storing one or more first ID codes each enabling the start-up of an engine;

a second memory means for storing a second ID code that is different from the first ID codes for activating a renewal mode in which the first ID codes may be rewritten;

a registration discrimination means for comparing an inputted ID code with the first and second ID codes registered in said respective memory means thereby to determine whether or not the inputted ID code has been registered;

an enabling means for generating an enable signal when an inputted ID code is determined to be the same as any one of the first ID codes;

an engine control means responsive to the enable signal for controlling the engine so that the engine is started; and a renewal mode activation means for activating the renewal mode when the inputted ID code is determined to be the second ID code, wherein in the renewal mode when a particular first ID code registered and at least one of other ID codes are consecutively inputted in this order, the particular first ID code and the at least one of other ID codes are registered in the first memory means as new first ID codes.

2. A vehicle anti-theft device as set forth in claim 1 wherein said ID codes are individually obtained from separate keys in which said ID codes are stored, and the engine is not started up by the key having the second ID code stored therein.

3. A vehicle anti-theft device as set forth in claim 1 wherein said ID codes are individually obtained from separate keys in which said ID codes are stored, the key having the first ID code stored therein and the key having the second ID code stored therein being different in appearance.

4. A vehicle anti-theft device as set forth in claim 1 further comprising a display means for outputting different display patterns depending on how and/or in what order ID codes are inputted after the inputting of the second ID code.

5. A vehicle anti-theft device as set forth in claim 1 wherein said enabling means creates an enable signal based on any of the first ID codes registered in a predetermined area of said first memory means.

6. A vehicle anti-theft device comprising:

a first memory means for storing one or more first ID codes each enabling the start-up of an engine;

a second memory means for storing a second ID code that is different from the first ID codes, for activating a renewal mode in which the first ID codes may be rewritten;

a means for detecting an ID code registered in each key inserted in a key cylinder of an engine;

a registration determination means for comparing the detected ID code with the first and second ID codes thereby to determine whether or not said detected ID code has been registered;

an enabling means for generating an enable signal when the detected ID code is determined to be any one of the first ID codes;

an engine control means responsive to the enable signal for controlling the engine so as to be operated;

a renewal mode activation means for activating the renewal mode when the detected ID code is determined to be the second ID code; and an ID code revision means for revising at least a part of the first ID codes in said renewal mode, wherein the engine cannot be operated by a second key having the second ID code stored therein, and a first key having the first ID code stored therein and the second key are different in appearance.

* * * * *